US008793503B2

(12) United States Patent
Simske et al.

(10) Patent No.: US 8,793,503 B2
(45) Date of Patent: Jul. 29, 2014

(54) MANAGING SEQUENTIAL ACCESS TO SECURE CONTENT USING AN ENCRYPTED WRAP

(75) Inventors: Steven J. Simske, Fort Collins, CO (US); Helen Balinsky, Cardiff (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 13/106,354

(22) Filed: May 12, 2011

(65) Prior Publication Data
US 2012/0290849 A1 Nov. 15, 2012

(51) Int. Cl.
*G06F 21/00* (2013.01)
(52) U.S. Cl.
USPC .............................. 713/189; 713/168; 713/166
(58) Field of Classification Search
USPC ........................................................ 713/189
See application file for complete search history.

(56) References Cited

U.S. PATENT DOCUMENTS

| | | | |
|---|---|---|---|
| 5,504,818 A * | 4/1996 | Okano | 713/166 |
| 6,393,125 B1 | 5/2002 | Barbir | |
| 6,598,161 B1 * | 7/2003 | Kluttz et al. | 713/166 |
| 7,184,947 B2 | 2/2007 | Matsuoka et al. | |
| 7,386,550 B2 | 6/2008 | Brun | |
| 7,386,724 B2 | 6/2008 | Coldicott et al. | |
| 7,496,767 B2 | 2/2009 | Evans | |
| 2002/0152384 A1 * | 10/2002 | Shelest et al. | 713/176 |
| 2002/0174238 A1 | 11/2002 | Sinn et al. | |
| 2003/0217264 A1 * | 11/2003 | Martin et al. | 713/156 |
| 2006/0047977 A1 | 3/2006 | Hanasaki | |
| 2006/0075228 A1 | 4/2006 | Black et al. | |
| 2007/0130425 A1 * | 6/2007 | Ueda | 711/115 |
| 2009/0077376 A1 | 3/2009 | Montagut et al. | |
| 2009/0112867 A1 | 4/2009 | Roy et al. | |
| 2009/0150761 A1 | 6/2009 | Sawicki et al. | |
| 2009/0328156 A1 | 12/2009 | Malaviarachchi et al. | |
| 2010/0046749 A1 | 2/2010 | Hatano et al. | |
| 2010/0070464 A1 | 3/2010 | Aymeloglu et al. | |
| 2010/0070756 A1 | 3/2010 | Onno et al. | |

FOREIGN PATENT DOCUMENTS

| | | |
|---|---|---|
| JP | 2005184222 A | 7/2005 |
| JP | 2009134598 A | 6/2009 |
| KR | 20040024946 A | 3/2004 |

OTHER PUBLICATIONS

Schneier "Applied Cryptography", 1996, Second Edition, 35-39.*
Balinsky et al, Pubicly Posted Composite Documents in Variably Ordered Workflows, 2011, International Joint Conference of IEEE TrustCom, 631-638.*
Hatano et al, A Study on Read-Write Protection of a Digital Document by Cryptographic Techniques, 2009, IEEE pp. 714-721.*
Simske, Steven J. And Helen Balinsky, "APEX:Automated Policy Enforcement eXchange", Oct. 6, 2010.

* cited by examiner

*Primary Examiner* — Luu Pham
*Assistant Examiner* — Brian Olion

(57) ABSTRACT

In a method for managing sequential access to secure content by a plurality of workflow participants, a key-map file for each of the participants is created. Each of the key-map files contains a subset of encryption and signature keys for the content. The key-map files are sorted in an order that is the reverse of a workflow order in which the workflow participants for which the key-map files were created are to access the secure content. An encrypted later wrap including a later key-map file for a later workflow participant along the workflow order and an encrypted first wrap including a prior key-map file for a prior workflow participant and the encrypted later wrap are created. In addition, the first wrap is incorporated into a document serialization for the content.

20 Claims, 7 Drawing Sheets

MANAGING SEQUENTIAL ACCESS TO SECURE CONTENT USING AN ENCRYPTED WRAP

CROSS REFERENCE TO RELATED APPLICATION

The present application contains common subject matter with co-pending and commonly assigned PCT Application Serial No. PCT/US10/49638, entitled "Providing Differential Access to a Digital Document", filed on Sep. 21, 2010, U.S. patent application Ser. No. 12/949,510, entitled "Managing Access to a Secure Digital Document", filed on Nov. 18, 2010, and U.S. patent application Ser. No. 13/014,062, entitled "Managing Information in a Document Serialization", filed on Jan. 26, 2011, the disclosures of which are hereby incorporated by reference in their entireties.

BACKGROUND

In recent years, there has been a growing trend to move away from printing information on paper and instead, to the use of digital documents, which contain digital content. Examples of digital documents include, for instance, portable document format (pdf) documents, electronic spreadsheets, electronic drawings, documents generated through use of a word processing application, and html pages. The digital documents may also include composite documents that include a mixture of different types of formats.

With paper documents, an individual's signature or other handwritten marks are used to determine whether various changes or additions to the documents were made by an authorized individual. However, such modifications are not possible or are inconvenient with digital documents because these types of modifications will require the individual to print the digital document, sign or otherwise mark the document, and scan the marked document to prove that the modifications were made by the individual. This manner of controlling access to the documents, both paper and electronic, is easily attacked and may readily be counterfeited.

Various techniques have been proposed to prevent or reduce attacks and counterfeiting of digital documents. These techniques typically employ a database, such as, but not limited to filesystem, MICROSOFT SHAREPOINT, etc., upon which the digital documents are stored so that access to the database, or a network to which the database is connected, is controlled by preventing access to the database or network to a user unless that user possesses some secret information, such as a user identification and password. As such, in order for these security techniques to enforce access control on the digital documents, users are required to be granted access to the database or network.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
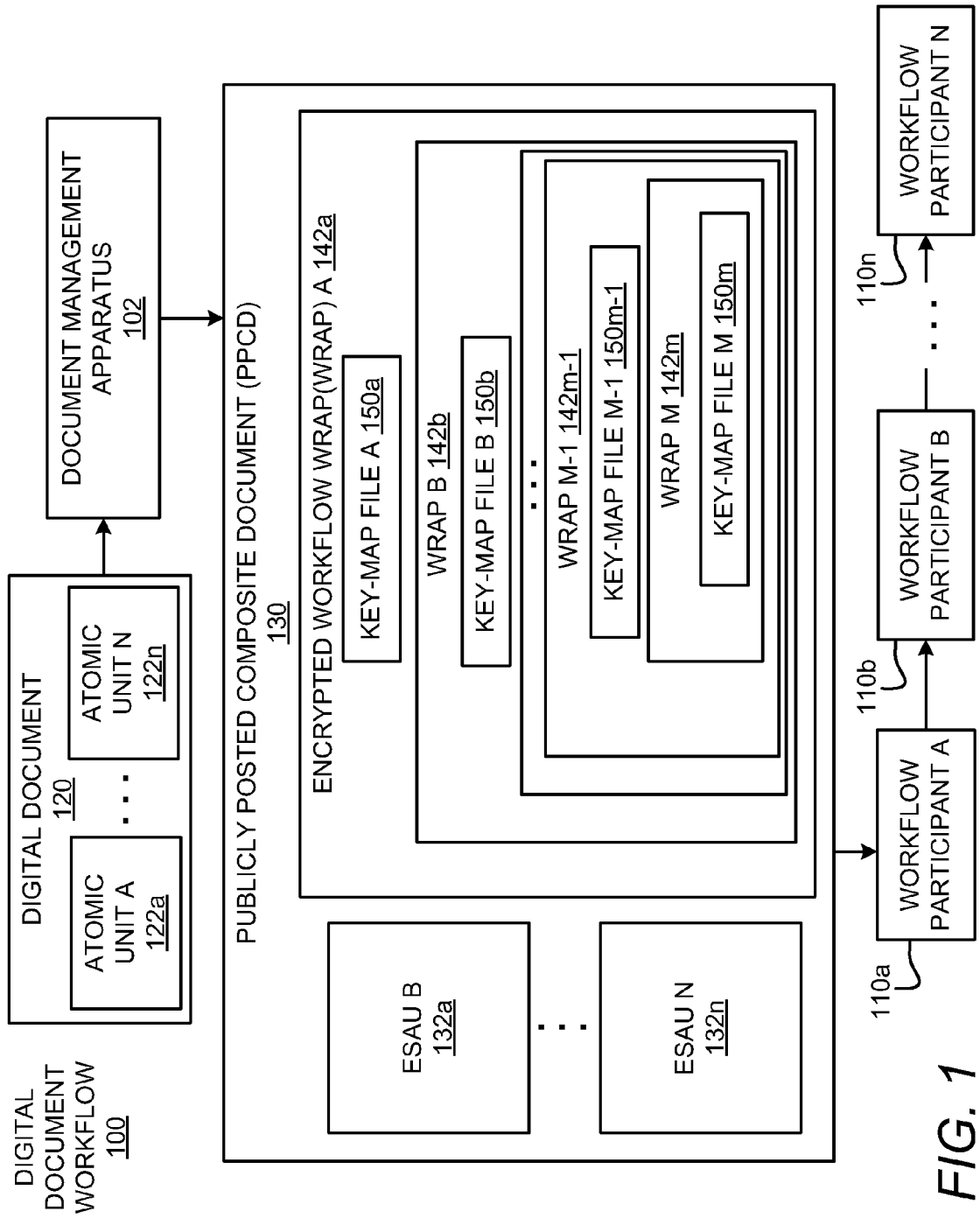
FIG. 1 illustrates a simplified schematic diagram of a digital document workflow, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the term "n" following a reference numeral is intended to denote an integer value that is greater than 1. In addition, ellipses (" . . . ") in the figures are intended to denote that additional elements may be included between the elements surrounding the ellipses. Moreover, the terms "a" and "an" are intended to denote at least one of a particular element. As used herein, the term "includes" means includes but not limited to, the term "including" means including but not limited to. The term "based on" means based at least in part on.

A secure digital document is a digital document that has been encrypted (and in certain instances, signed) to substantially prevent unauthorized access to the digital document. The digital document may comprise a composite document, which is composed of a variety of individual addressable and accessible parts (units) in the form of separate files or addressable file fragments. For example, the units may include individual files, groups of files, or file fragments, such as, html fragments, xml nodes, presentation slides, word processing text boxes, parts of a spreadsheet document, an electronic object containing drawings, an electronic object having flash video capabilities, etc. The individual addressable and accessible parts are recited as "atomic units" or "secure atomic units" throughout the present disclosure. In addition, the atomic units of a particular digital document may comprise the same format or different formats from each other. According to an example, and as depicted in Table I below, the atomicity of the accessible parts may be extended to the byte level. As shown in Table I, the file "Spreadsheet1" has three differently secured parts containing elements.

| Accessible Part # | Set of File {byte range} |
| --- | --- |
| 1 | Summary.doc {1-345; 3,245-7,777}, Spreadsheet1.xls{1-5,663}; Advertisement2.pdf{1-73,454} |
| 2 | Summary.doc {346-3,244} |
| 3 | Spreadsheet1.xls{5,664-8,993; 10,435-23,331} |
| 4 | Spreadsheet1.xls{8.994-10.434}; Advertisement2.pdf{1-433,278} |
| . . . | . . . |

A number of parties are often involved in the participation, for instance, creation, editing, ratification, etc., of secure digital documents (atomic units), which may comprise composite documents, publicly posted composite documents (PPCD), as well as other types of documents. In addition, the parties involved in the participation are often outside of a secure environment, such as, an environment maintained behind firewalls or other security features. The parties are often required to access the secure digital documents in a predefined sequential order. Disclosed herein are a method and apparatus for enforcing the predefined sequential access to a secure digital document by a plurality of workflow participants.

Through implementation of the method and apparatus disclosed herein, the workflow participants may be prevented from accessing (and modifying) a secure digital document out of the predefined sequential access order. The sequential access order may be managed by preventing access to the keys, which may be provided within key-map files within the secure digital document itself, required to access the secure digital document until a prior workflow participant in the sequential access order has accessed the secure digital document. In one regard, therefore, if the secure digital document is accidentally or intentionally transmitted to a workflow participant out of sequence, the workflow participant will be unable to access the secure digital document. As such, the present method and apparatus prevent unauthorized access and sequence modifications, and workflow participants are able to access the secure digital document in the order specified by the document master when the secure digital document was created.

With reference first to FIG. 1, there is shown a simplified diagram of a digital document workflow 100, according to an example. It should be readily apparent that the diagram depicted in FIG. 1 represents a generalized illustration and that other components may be added or existing components may be removed, modified or rearranged without departing from a scope of the digital document workflow 100.

The digital document workflow 100 is depicted as including a document management apparatus 102, a plurality of workflow participants (hereinafter "participants") 110a-110n, a digital document 120 containing a plurality of atomic units 122a-122n, and a publicly posted composite document (hereinafter "PPCD") 130. The PPCD 130 is also depicted as containing a plurality of secure atomic units (hereinafter "ESAUs") 132a-132n and encrypted workflow wraps (hereinafter "wraps") 142a-142m. The document management apparatus 102 may comprise a hardware device, such as, a computer, a server, a circuit, etc., to perform various functions in encrypting documents and controlling distribution of keys to each of the participants 110a-110n to access the PPCD 130. Various functions that the document management apparatus 102 may perform are discussed in greater detail herein.

The participants 110a-110n generally represent computing devices through which the participants 110a-110n may receive, and when granted sufficient access, to at least one of view, edit, and acknowledge receipt of the PPCD 130. The computing devices may comprise, for instance, personal computers, laptop computers, tablet computers, personal digital assistants, cellular telephones, etc.

The document management apparatus 102 may be in a secure environment where the digital document owner/creator/master has access to the document management apparatus 102, and at least one of the computing devices of the participants 110a-110n is outside of the secure environment. In other words, some or all of the participants 110a-110n may not access the PPCD 130 from a common database that controls access to the PPCD 130. Instead, the PPCD 130 may be supplied to and among the participants 110a-110n through, for instance, e-mail, a shared server, direct file transfer, removable storage medium, etc. In addition, some or all of the participants 110a-110n may not be granted access to the secure environment of the document management apparatus 102 in instances where such access is impractical or prohibited.

The digital document 120 may comprise any reasonably suitable type of document in a digital form and may comprise at least one digital document, which may be in the same or different formats with respect to each other. Examples of suitable document types include, for instance, portable document format, spreadsheet, JPEG or any other image, word processing document, hypertext markup language (html), etc. In addition, the atomic units 122a-122n generally comprise individual addressable elements within the digital document 120, such as, signature lines, cells or columns within a spreadsheet, paragraphs, graphics boxes, etc. As discussed above with respect to Table I, the atomic units 122a-122n may also be extended to the byte level, for instance, as different elements of the same spreadsheet. As another example, the atomic units 122a-122n may comprise logical aggregations of parts from multiple digital documents. As a further example, digital documents may be in multiple atomic units 122a-122n.

Generally speaking, the document management apparatus 102 is to generate the PPCD 130 such that the participants 110a-110n are unable to access the PPCD 130 until participants 102a-102n that are located further upstream in a predetermined access order have accessed the PPCD 130 as discussed in greater detail herein. In addition, the sequential access by the participants 110a-110n may be effected while at least one of the participants 110a is outside of at least one of a common and a uniformly-secure environment as another one of the participants 110b. That is, for instance, at least some of the participants 110a-110n may attempt to access the PPCD 130 in environments with different levels of security.

As also shown in FIG. 1, the document management apparatus 102 may encrypt and sign the digital document 120 and/or the atomic units 122a-122n using various sets of keys as discussed in greater detail herein below. In this regard, the document management apparatus 102 may generate (or derive) needed encryption and signature keys, encrypt and sign the digital document 120 and/or atomic units 122a-122n and may supply the generated PPCD 130, which may comprise an encrypted and signed versions of the digital document 120 and/or the atomic units 132a-132n, to the first participant 110a in the predetermined sequential access order.

As also shown in FIG. 1, the PPCD 130 comprises encrypted wraps 142a-142m, in which "m" denotes an integer value greater than 1. The wraps 142a-142m generally comprise electronic objects, such as, electronic storage, serializations, etc., that are able to contain other wraps 142b-142c and key-map files 150a-150n and to be encrypted. By way of particular example, the wraps 142a-142m comprise objects that are able to combine data fragments, including the key-map file for the participant and the wrap(s) for the next participant(s).

In FIG. 1, a last wrap 142m is depicted as encapsulating a last key-map file 150m and as being encapsulated in a second to last wrap 142m−1. The second to last wrap 142m−1 is depicted as encapsulating a second to last key-map file 150m−1 and as being encapsulated in a preceding wrap 142m−2. The ellipses in the preceding wrap 142m−2 denote that any number of wraps may be present between the second to last wrap 142m−1 and the first wrap 142a. The first wrap 142a is depicted as encapsulating a first key-map file 150a and the second to last wraps 142b-142m. The order in which the wraps 142a-142m are encapsulated within each other is based upon the predetermined sequential order in which the participants 110a-110n are to access the PPCD 130. Thus, in the example depicted in FIG. 1, the first participant 110a is to access the PPCD 130 first, the second participant 110b is to access the PPCD 130 second, the third participant 110c is to access the PPCD 130 third, etc. In this regard, the first wrap 142a is associated with the first participant 110a, the second wrap 142b is associated with the second participant 110b, the third wrap 142c is associated with the third participant 110c, and so forth.

Although not shown, each of the wraps 142a-142m may include document level information, which comprises readily-verifiable document level information that links the PPCD 130 and the workflow. The document level information may contain various information including, for instance, a unique document identifier, a timestamp, the deadline of submission to the next participant 110b-110n in the sequential access, etc. The document level information may also contain information pertaining to the next participant 110b-110n in the sequential access order. This information may include, for instance, an email address, a postal address, etc., of the next participant 110b-110n. The document level information in the last wrap 142c, however, does not include next participant information since there are no additional participants.

Each of the key-map files 150a-150n contains respective sets of keys to be used by the respective participants 110a-110n in decrypting, and in certain instances, verifying the signature of, the PPCD 130. As discussed in greater detail below, the first wrap 142a containing a first key-map file 150a may be encrypted using a public key of the first participant 110a and thus, the keys contained in the first key-map file 150a may be accessible through use of the private key of the first participant 110a. The remaining wraps 142b-142m may be encrypted using the public keys of the respective participants 110a-110n that are to access the wraps 142b-142m.

According to an example, the PPCD 130 contains a pseudo wrap that has no association with any of the participants 110a-110n, and appears visually similar to the other wraps 142a-142m. In addition, the PPCD 130 may contain a relatively larger number of pseudo wraps as compared with the number of participants 110a-110n to thereby hide the number of participants 110a-110n who are to receive the PPCD 130. The pseudo wraps also hide identification of which of the wraps 142a-142m contain valid key-map files 150a-150n, thereby rendering it more difficult for an unauthorized user to identify which of the key-map files 150a-150n are valid and may be used to decrypt the encryption applied on the PPCD 130. According to an example, the number of actual and pseudo wraps may be preset to be the same for all of the documents, for instance, of a particular type to therefore further obfuscate the identities of the valid wraps 142a-142m.

The wrap ($R_i$) 142a-142m for the ith participant 110a-110n (i=1 . . . N) in a workflow with N steps may be defined recursively by the following equation:

$$R_i = Enc_i\{map_i + docInf + R_{i+1}\}, \text{ where } R_{N+1} = 0 \text{ for a workflow with } N \text{ participants.} \quad \text{Equation (1):}$$

In Equation (1), map, is the key-map file 150a-150n of the ith participant 110a-110n, docInf is the document level information, and $R_{i+1}$ is the next wrap 142b-142m in the sequential access order. The $Enc_i$ indicates that each wrap 142a-142m is encrypted by hybrid encryption that includes the public key of the intended workflow participant.

According to an example, the workflow wrap encryption keys comprise respective public keys of the participants 110a-110n. In this example, the decryption keys for decrypting the wraps 142a-142m by the participants 110a-110n may not need to be distributed to the participants 110a-110n since the participants 110a-110n may use their private keys to decrypt the respective wraps 142a-142m. According to another example, the corresponding decryption keys may be distributed to the respective participants 110a-110n in any suitable manner, such as, any of the manners discussed in the Ser. No. 12/949,510 application for patent. The corresponding decryption key to decrypt the first wrap 142a may be supplied to the first participant 110a that is to access the first wrap 142a, the corresponding decryption key to decrypt the second wrap 142b is supplied to the second participant 110b that is to access the second wrap 142b, and so forth. In this regard, each of the participants 110a-110n may only be provided the decryption keys for the wrap 142a-142m for which they are to be given access.

According to an example, each of the wraps 142a-142m is signed by the document master signature key, with each participant 110a-110n having received or being able to receive the corresponding document master's signature verification key. The authenticity of the wraps 142a-142m within the received PPCD 130 may therefore be automatically verified upon receiving the PPCD 130 through use of the document master's signature verification key to authenticate the signature of the wraps. Once authentication is established, the participant (i−1) may decrypt the corresponding wrap 142a-142m using hybrid decryption with the participant's (i−1) private decryption key. If, however, the participant (i−1) out of turn in the predetermined workflow order, the decryption attempt will fail, for instance, with junk data being extracted. Thus, the participant (i−1) will be unable to gain access to the PPCD 130. In addition, the participant's (i−1) failed attempt may alert a previous participant (i−2) and/or the workflow master that the participant (i−1) received the PPCD 130 out of the predetermined workflow order. However, the participant (i−1) may be able to decrypt the PPCD 130 with, for instance, the participant's public key if the participant (i−1) attempts to decrypt the PPCD 130 at the correct position in the predetermined workflow order. Upon a successful decryption, the participant (i−1) automatically extracts:

1) the participant's (i−1) own key-map file 150a-150m; and
2) the $R_i$ entry, which is the workflow wrap 142a-142m for the next participant (i).

According to another example, the participant (i) may not be required to verify the signature of the wrap ($R_{i+1}$), extracted for the subsequent participant (i+1), as the participant (i) has already established trust with its wrap ($R_i$). In other examples, the order of applying signature and verification may be swapped, thus, for instance, the {$map_i$+docInf+$R_{i+1}$} may be signed prior to being encrypted.

In any regard, the document management apparatus 102 may associate the last wrap 142m for the last participant 110n with the prior wrap 142m−1 to prevent access to the last wrap 142m prior to the prior wrap 140n−1 being accessed. By way of example, the document management apparatus 102 may include the last wrap 142m in an encrypted package or encapsulation to be decrypted by the prior participant 110n−1, as noted in Equation (1) above. Thus, access to the last wrap 142m is prevented until the prior wrap 140n−1 has been decrypted.

The document management apparatus 102 may incorporate the wraps 142a-142m into the PPCD 130, such that, the wraps 142a-142m may simultaneously be provided to the participants 110a-110n with the PPCD 130. In addition, the wraps 142a-142m have been depicted as being included within higher access order wraps 142a-142m to illustrate that access to the higher access order wraps 142a-142m is required to gain access to the lower access order wraps 142a-142m. It should, however, be understood that the wraps 142a-142m may be provided in various other manners while maintaining enforcement of a predetermined sequential access order by the participants 110a-110n. For instance, the information contained in each of the wraps 142a-142m may be contained in a table format, in which the next participant information may identify which entry in the table pertains to the next participant 110b. In this example, the table may contain a number of pseudo wraps to hide the number of wraps and identification of which of the key-map files 150a-150n are valid.

Figure 2:
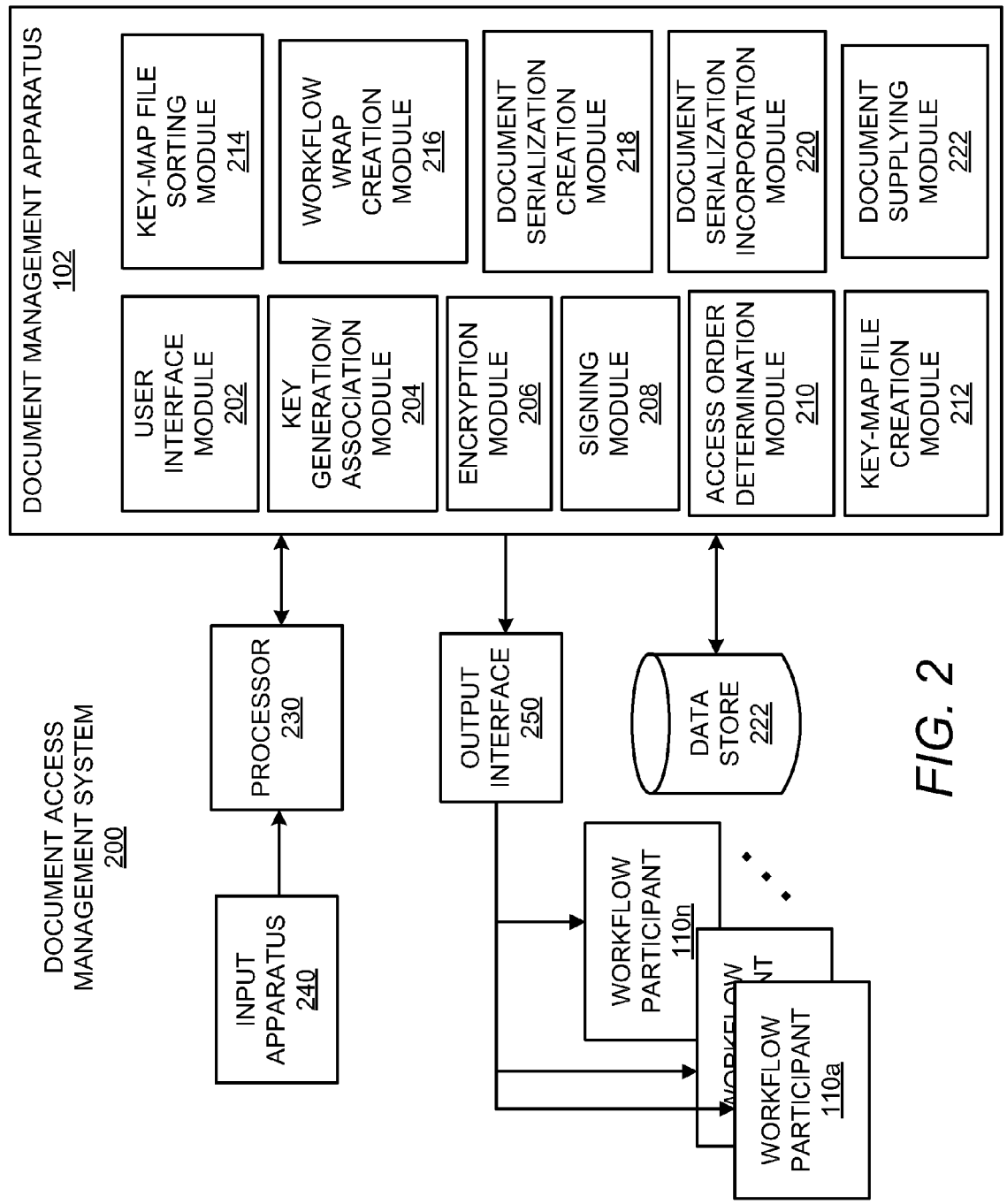
FIG. 2 shows a simplified block diagram of a document access management system containing the document management apparatus depicted in FIG. 1, according to an example of the present disclosure.

With particular reference now to FIG. 2, there is shown a simplified block diagram of a document access management system 200 containing the document management apparatus 102 depicted in FIG. 1, according to an example. It should be apparent that the block diagram depicted in FIG. 2 represents a generalized illustration and that other components may be added or existing components may be removed, modified or rearranged without departing from a scope of the document access management system 200.

As shown in FIG. 2, the document management apparatus 102 includes a user interface module 202, a key generation/association module 204, an encryption module 206, a signing module 208, an access order determination module 210, a key-map file creation module 212, a key-map file sorting module 214, a workflow wrap creation module 216, a document serialization creation module 218, a document serialization incorporation module 220, and a document supplying module 222. The modules 202-222 may comprise software modules, hardware modules, or a combination of software and hardware modules. Thus, in one example, at least one of the modules 202-222 comprises a circuit component. In another example, at least one of the modules 202-222 comprises machine-readable code stored on a computer readable storage medium, which is executable by a processor.

In any regard, the document management apparatus 102 is to be implemented and/or executed by a processor 230. Thus, for instance, the document management apparatus 102 may comprise an integrated and/or add-on hardware device of a computing device comprising the processor 230. As another example, the document management apparatus 102 may comprise a computer readable storage device upon which machine-readable instructions for each of the modules 202-220 is stored and executed by the processor 230.

As further shown in FIG. 2, the processor 230 is to receive input from an input apparatus 240. The input apparatus 240 may comprise, for instance, a user interface through which a user may supply keys for use in encrypting/signing the digital document 120/atomic units 122a-122n and the wraps 142a-142m. The input apparatus 240 may also comprise a user interface through which a user may define the order in which the participants 110a-110n are to access secure content, such as, the PPCD 130 and/or the ESAUs 132a-132n contained in the PPCD 130.

The various keys used to encrypt and sign the content (PPCD 130 and/or the ESAUs 132a-132n) and the wraps 142a-142m may be stored in a data store 222. Various keys used to decrypt and verify the signatures of the secure content (PPCD 130 and/or the ESAUs 132a-132n) and the wraps 142a-142m may also be stored in the data store 222, which may comprise volatile and/or non-volatile memory, such as DRAM, EEPROM, MRAM, phase change RAM (PCRAM), Memristor, flash memory, and the like. In addition, or alternatively, the data store 222 may comprise a device to read from and write to a removable media, such as, a floppy disk, a CD-ROM, a DVD-ROM, or other optical or magnetic media.

Figure 3:
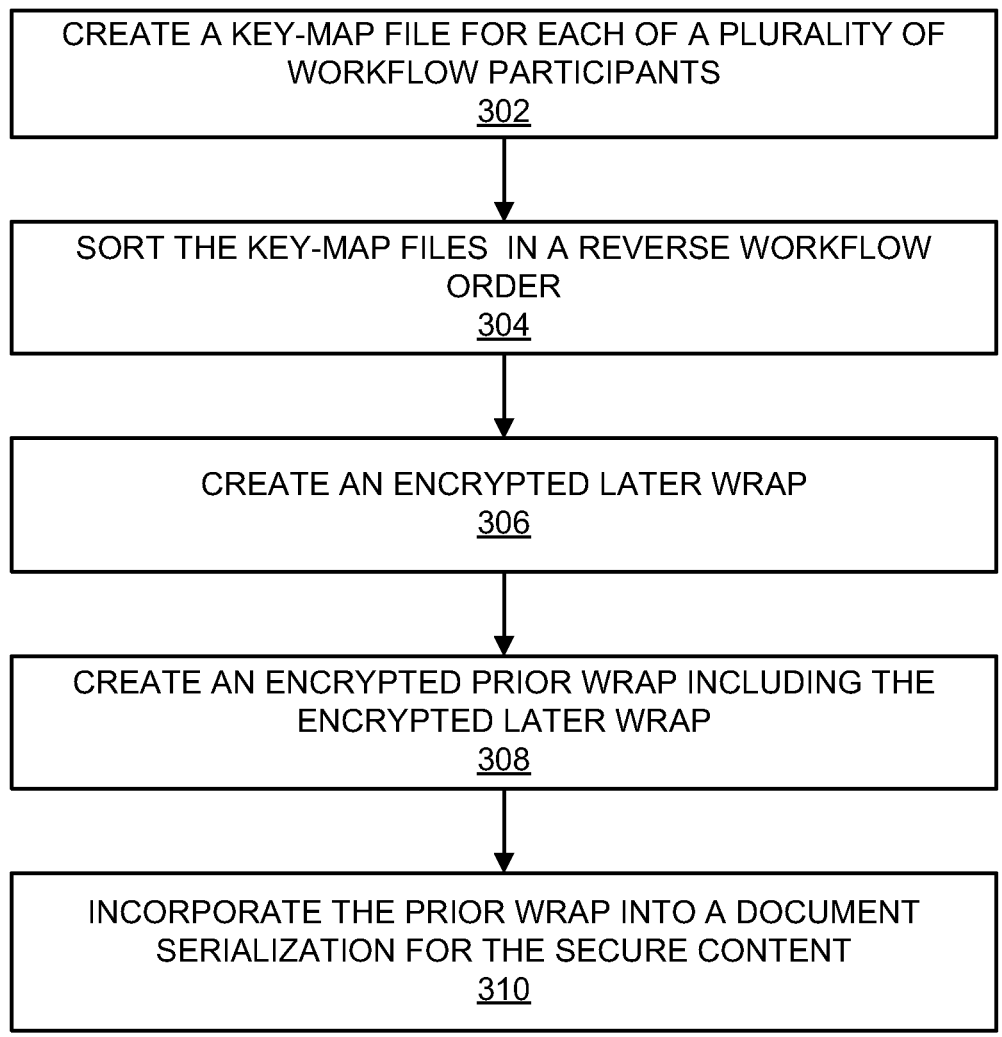
FIGS. 3 and 4, respectively show flow diagrams of methods for managing sequential access to secure content by a plurality of workflow participants, according to an example of the present disclosure.
Figure 4:
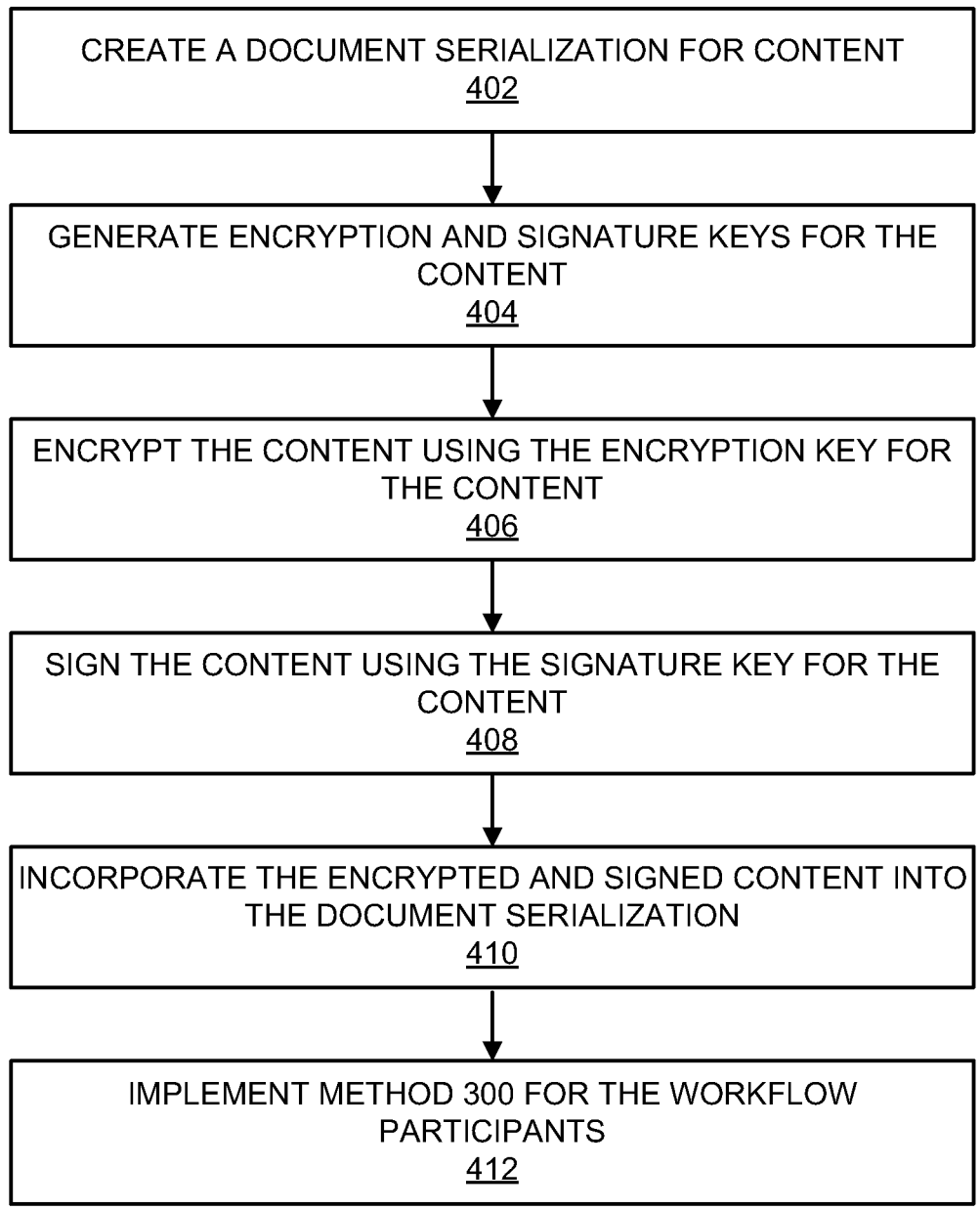

Various manners in which the processor 230 may implement the modules 202-222 are described in greater detail with respect to FIGS. 3 and 4, which, respectively depict flow diagrams of methods 300 and 400 for managing sequential access to secure content (PPCD 130/ESAUs 132a-132n) by a plurality of participants 110a-110n, according to an example. It should be apparent that the methods 300 and 400 represent generalized illustrations and that other operations may be added or existing operations may be removed, modified or rearranged without departing from the scopes of the methods 300 and 400.

The descriptions of the methods 300 and 400 are made with particular reference to the document management apparatus 102 depicted in FIGS. 1 and 2. It should, however, be understood that the methods 300 and 400 may be implemented in an apparatus that differs from the document management apparatus 102 without departing from the scopes of the methods 300 and 400. In addition, the method 300 and 400 may be implemented by the document management apparatus 102 while the content is within a secure environment and prior to the content being released outside of the secure environment.

With reference first to the method 300 in FIG. 3, at block 302, a key-map file for 150a-150m is created for each of the workflow participants 110a-110n, for instance, by the key-map file creation module 212. The key-map file creation module 212 may create the key-map files to each contain a subset of encryption and signature keys for a particular secure content, such as, a PPCD 130 and/or ESAUs 132a-132n. The subset of the encryption and signature keys for the secure content contained in each of the key-map files 150a-150m may correspond to a level of access granted to the secure content by each of the respective workflow participants 110a-110n. The subset of encryption and signature keys corresponding to various levels of access granted to each of the participants 110a-110n are described, for instance, in the PCT Application Serial No. PCT/US10/49638.

At block 304, the key-map files 150a-150m are sorted in an order that is the reverse of a predetermined workflow order in which the participants 110a-110n for which the key-map files 150a-150m were created are to access the secure content, for instance, by the key-map file sorting module 214. Thus, for instance, the key-map file sorting module 214 may sort the key-map files 150a-150m in order from the last participant 110n that is to access the secure content to the first participant 110a that is to access the secure content.

According to an example, the predetermined workflow access order is determined, for instance, by the access order determination module 210. The determination of the workflow access order may also include a determination of the participants 110a-110n that are to receive the secure content. The access order determination module 210 may determine the workflow access order for the participants 110a-110n in a variety of manners. For instance, the access order determination module 210 may determine the workflow access order through receipt of an instruction containing the workflow access order from a user either directly through the input apparatus 240 or from the data store 222. In another example, the access order determination module 210 may determine the workflow access order of the participants 110a-110n automatically, for instance, based upon the type of document to be placed into the workflow. In any regard, the predetermined access order may primarily be defined by a business objective of the secure content and logic of the secure content. For example, an employ completes and submits a travel approval form, which is then verified and approved by a manager, and then authorized by an upper-level manager.

At block 306, an encrypted later wrap 142m including a later key-map file 150m for a later workflow participant 110n along the workflow order is created, for instance, by the workflow wrap creation module 216. More particularly, for instance, the workflow wrap creation module 216 may create the encrypted later wrap 142m, which may comprise an electronic object, such as, an electronic storage, a serialization, etc., to include the later key-map file 150m. In addition, if the later workflow participant 110n is not the last workflow participant to receive the secure content in the predetermined order, the workflow wrap creation module 216 may also include the encrypted wrap 142m+1 containing the key-map file 150m+1 of the next workflow participant 110n+1. In any regard, the workflow wrap creation module 216 may create the encrypted later wrap 142m through implementation of Equation (1) discussed above.

In addition, the workflow wrap creation module 216 may encrypt and sign the encrypted later wrap 142m using an encryption key and a signature key. According to an example, the encryption key comprises the public key of the later workflow participant 110n. According to another example, the encryption key comprises a separately derived or generated key for the later workflow participant 110n. In any regard, the later wrap 142m may be encrypted using hybrid encryption, for instance, where a specially generated symmetric key (for instance, AES) is used to encrypt the later wrap 142m, and then the symmetric key is encrypted using the later workflow participant's 110n public encryption key. In addition, the encrypted symmetric key is placed in close association to the corresponding workflow wrap 142m. In addition, or alternatively, the signature key may comprise a signature key specifically generated for the later workflow participant 110n or the signature key may comprise a master signature key of the a creator the content.

At block 308, an encrypted prior wrap 142m−1 including the encrypted later wrap 142m and a prior key-map file 150m−1 for a prior workflow participant 110n−1 along the predetermined workflow order is created, for instance, by the workflow wrap creation module 216. The workflow wrap creation module 216 may create the prior wrap 150m−1 in any of the manners discussed above with respect to the later wrap 150m. In one regard, therefore, access to the encrypted later wrap 142m is prevented without first accessing and removing the encrypted prior wrap 142m−1.

Although not shown in FIG. 3, block 308 may be repeated for additional participants 110a-110n−2 to thereby create encrypted prior wraps including the later wraps 142a-142m−2 and the key-map files 150a-150m−2. Regardless of the number of encrypted wraps 142a-142n that are created through implementation of the method 300, each of the encrypted wraps 142b-142n are encapsulated within a prior wrap 142a.

At block 310, the prior wrap 142 is incorporated into a document serialization for the secure content, for instance, by the document serialization incorporation module 220. The document serialization for the secure content may comprise, for instance, a SQLite database, ZIP archive, etc.

Although not shown, the secure content including the encrypted wraps 142a-142m may be supplied to the prior participant 110n−1, which may be construed as the first participant in the workflow, and the method 300 may end.

Turning now to FIG. 4, which includes the method 300 as part of the method 400, at block 402, a document serialization for content to be accessed by a plurality of workflow participants 110a-110n is created, for instance, by the document serialization creation module 218. By way of example, the document serialization creation module 218 may create the document serialization for the content by creating a new SQLite database, ZIP archive, or the like.

At block 404, various encryption and signature keys for the content are generated or derived, for instance, by the key generation/association module 204. The key generation/association module 204 may generate/derive keys to be employed in encrypting and signing the digital document 120 to create the PPCD 130. The key generation/association module 204 may also generate/derive keys to be employed in encrypting and signing the atomic units 122a-122n to create the ESAUs 132a-132n. Furthermore, the key generation/association module 204 may generate a single signature key or multiple signature keys to be used in signing the PPCD 130/ESAUs 132a-132n.

Alternatively to generating or deriving the various keys, the key generation/association module 204 may instead retrieve the various keys from another storage location, such as the data store 222. In any regard, the key generation/association module 204 may also determine which keys are associated with each of the elements (such as, atomic units 122a-122n) contained in the content.

At block 406, the content (digital document 120/atomic units 122a-122n) is encrypted using the encryption key(s) generated at block 404 to generate the secure content (PPCD 130/ESAUs 132a-132n), for instance, by the encryption module 206. At block 408, the content may also be signed using the signature key(s) generated at block 404 to generate the secure content, for instance, by the signing module 208. The encryption of the content may use any standard or proprietary encryption mechanism, such as, for instance, symmetric AES encryption, Twofish encryption, asymmetric RSA, etc. The content may be signed, for example, through use of a Digital Signature Algorithm, RSA based signatures, etc. In addition, each of the atomic units 122a-122n may be encrypted and signed using different encryption and signature keys.

At block 410, the encrypted and signed (secure) content is incorporated into the document serialization, for instance, by the document serialization incorporation module 220.

At block 412, the method 300 for the workflow participants 110a-110n is implemented to incorporate the workflow wraps 142a-142m and key-map files 150a-150m into the document serialization. In addition, although not shown, the document serialization of the secure document may be communicated to the first participant 110a in the predetermined workflow order, who may be outside of the secure environment in which the document management apparatus 102 is located.

Figure 5:
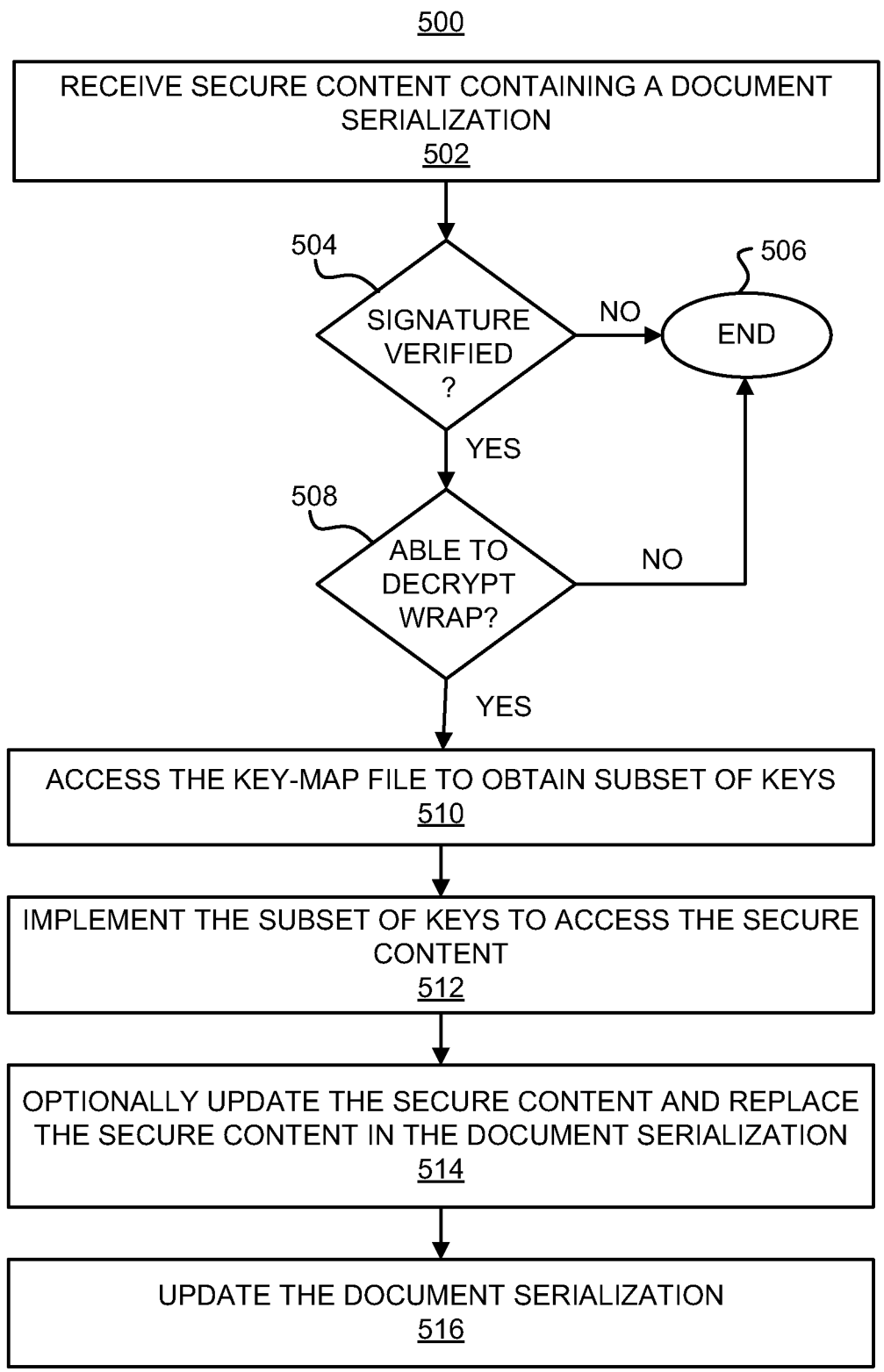
FIGS. 5 and 6, respectively show flow diagrams of methods for sequentially accessing secure content by workflow participants, according to an example of the present disclosure.
Figure 6:
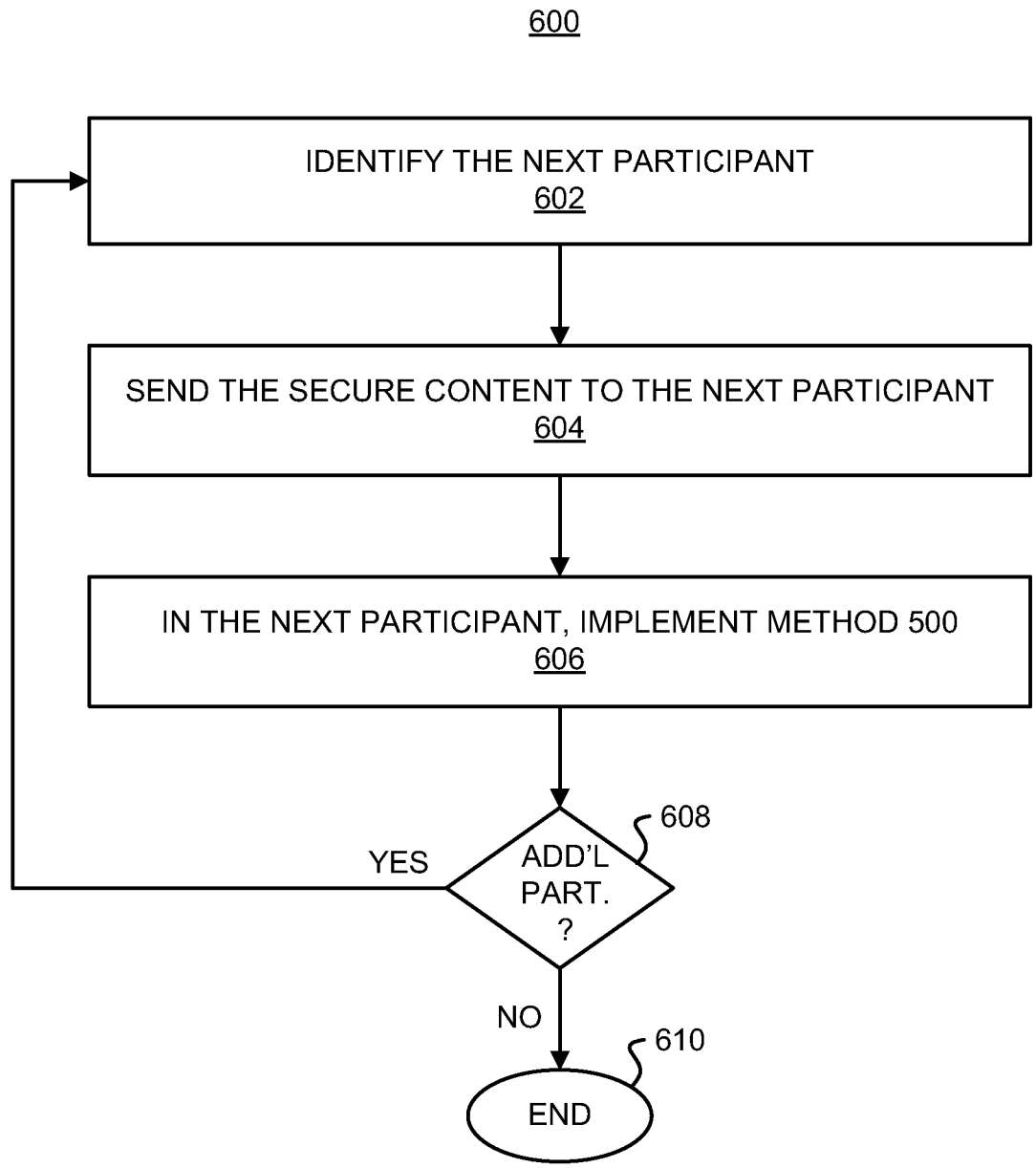

Turning now to FIGS. 5 and 6, there are respectively shown flow diagrams of methods 500 and 600 for accessing secure content by a particular workflow participant 110a of a plurality of workflow participants 110a-110n that are to access the secure content in a predetermined order, wherein the secure content contains a document serialization that includes an encrypted first wrap 142a, and wherein the encrypted first wrap 142a includes a key-map file 150a for the particular workflow participant 110a and an encrypted second wrap 142b, according to an example. It should be apparent that the methods 500 and 600 represents a generalized illustration and that other operations may be added or existing operations may be removed, modified or rearranged without departing from the scopes of the methods 500 and 600.

With reference first to FIG. 5, at block 502, the particular participant 110a or a computing device of the particular workflow participant 110a receives the secure content containing the document serialization. The particular participant 110a may receive the secure content from the document management apparatus 102 or from another participant 110b.

At block 504, the particular participant 110a verifies the authenticity of the secure content. More particularly, for instance, the particular participant 110a determines whether the signature used to sign the first wrap 142a is authentic through use of a signature verification key. That is, for instance, the particular participant 110a may determine that the secure content is authentic if the particular participant 110a is able to verify the signature used to sign the secure content with a signature verification key supplied to the particular participant 110a by, for instance, the secure content creator.

If the signature verification fails, the particular participant 110a may cease attempting to access the secure content (PPCD130/ESAUs 132a-132n) and the method 500 may end as indicated at block 506 as this may be an indication that the secure content has not been supplied by a trusted source.

If, however, the signature is verified, the particular participant 110a may attempt to decrypt the encrypted first wrap 142a using an appropriate decryption key, as indicated at block 508. The appropriate decryption key may comprise, for instance, a public key of the particular participant 110a, a hybrid decryption, etc. If the particular participant 110a is unable to decrypt the encrypted first wrap 142a, the method 500 may end at block 506 since this may be an indication that the particular participant 110a is attempting to access the secure content out of the predetermined order.

If, however, the particular participant 110a is able to decrypt the encrypted first wrap 142a using the appropriate decryption key of the particular participant 110a, the key map file 150a and the encrypted second wrap 142b contained in the encrypted first wrap 142a are uncovered. The key-map file 150a contains a subset of encryption and signature keys for the secure content, which may include multiple atomic units, in which, the subset of the encryption and signature keys corresponds to a level of access granted to the particular participant 110a to each part of the secure content. Thus, for instance, if the particular participant 110a is to be granted a read-only level of access to a particular part, the key-map file 150a may contain a decryption key and a signature key to decrypt and verify the signature of this part. The particular participant 110a may be granted a modify level of access to another, the key-map file 150a may also contain a second set of encryption and signature keys that the particular participant 110a may implement in encrypting an signing a modified version of the corresponding part of the secure content prior to forwarding the PPCD to the next workflow participant 110b in the predetermined workflow order.

At block 510, the particular participant 110a accesses the key-map file 150a contained in the encrypted first wrap 142a to obtain the subset of the encryption and signature keys.

At block 512, the particular participant 110a implements the subset of encryption and signature keys to access the secure content according to the level of access granted that has been granted to the particular participant 110a.

At block 514, the particular participant 110a optionally updates the secure content and replaces the secure content in the document serialization. Block 514 is optional because the particular participant 110a may implement block 514 when the particular participant 110a has been granted sufficient modification access to the secure content.

At block 516, the particular participant 110a updates the document serialization, for instance, by discarding the encrypted first wrap 142a and the first key-map file 150a. In addition, the particular participant 110a may replace the encrypted second wrap 142b into the secure content.

With reference now to FIG. 6, which includes the method 500 as part of the method 600, at block 602, the particular participant 110a identifies the next participant 602 that is to access the secure content. The particular participant 110a may have previously been informed of the next participant's 110b identity or the next participant's contact details, such as, where to mail, e-mail or upload the secure content, etc. Alternatively, the particular participant 110a may identify the next participant 110b or the next participant's contact details from information contained in document level information contained in the encrypted first wrap 142a. In addition, the information may indicate a manner in which the particular participant 110a is to communicate or send the secure content to the next participant 110b, such as, an email address of the next participant 110b or other information.

At block 604, the particular participant 110a sends the secure content, which contains the PPCD 130, the ESAUs 132a-132n and the encrypted workflow wrap 142b to the next participant 110b. As discussed above with respect to the method 500, access to the secure content by the particular participant 110a causes the encrypted first wrap 142a to be extracted and removed from PPCD 130, then the first wrap 142a is decrypted—the key-map and the second (subsequent) wrap are extracted, which is outside of the PPCD 130. The second wrap 142b is replaced back into PPCD 130. The first wrap 142a is removed and the encrypted second wrap 142b is replaced back into the PPCD 130 such that it becomes accessible by the next participant 110b.

At block 606, the next participant 110b implements the method 500. Following implementation of the method 500, the next participant 110b determines whether the secure content is to be sent to another participant 110c at block 608, for instance, as identified in the document level information contained in the encrypted second wrap 142b. If the secure content is to be sent to another participant 110c, the next participant 110b may identify the another participant 110c at block 602 and may send the secure content to the another participant 110c at block 604. The another participant 110c may also implement the method 500, as indicated at block 606. In addition, blocks 602-608 may be implemented by the remaining participants 110d-110n until a participant 110n determines that no additional participants are to access the secure content at block 608. In this instance, the method 600 may end as indicated at block 610.

Some or all of the operations set forth in the figures may be contained as a utility, program, or subprogram, in any desired computer readable storage medium. In addition, the operations may be embodied by machine-readable instructions. For example, they may exist as machine-readable instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 7:
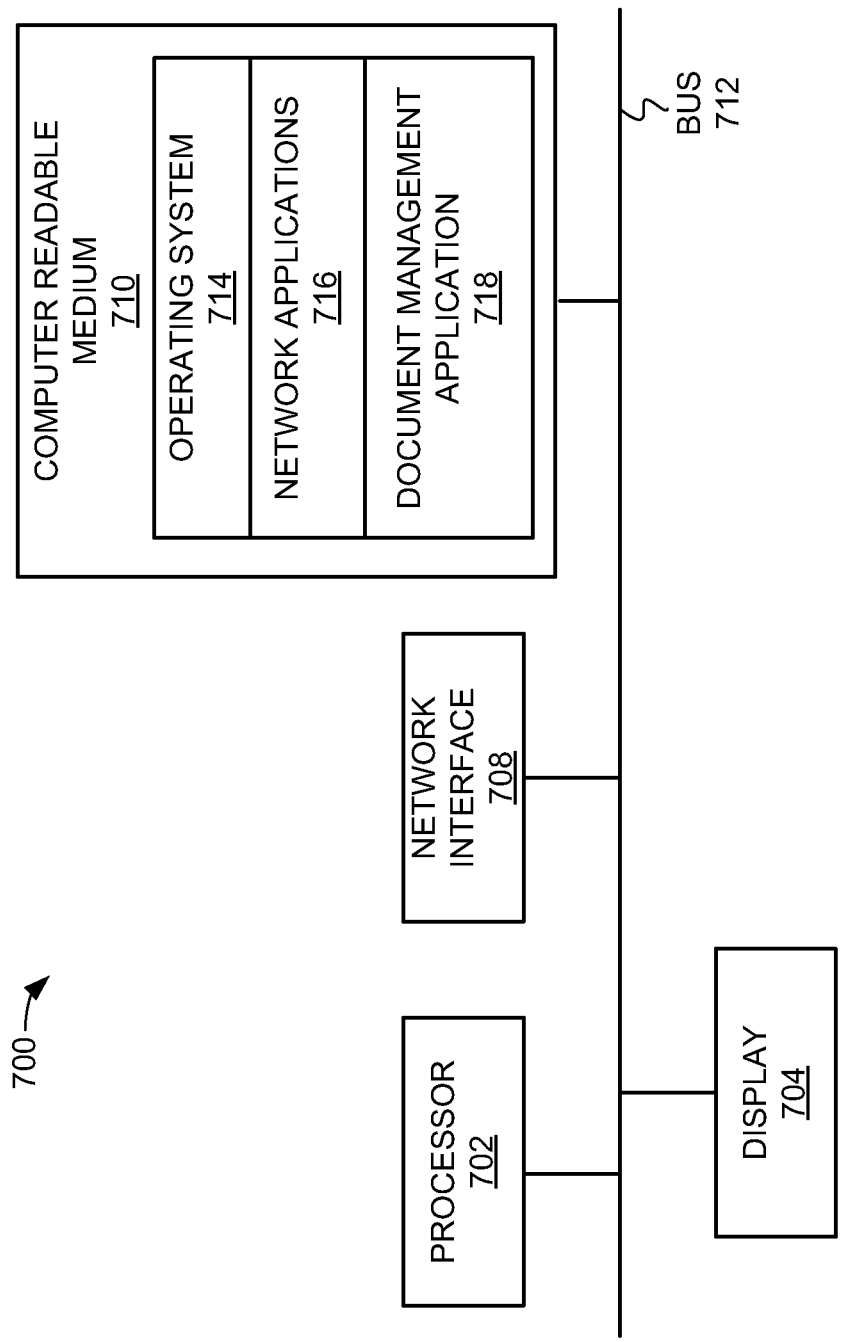
FIG. 7 shows a block diagram of a computer system that may be used as a platform for implementing or executing at least one of the processes depicted in FIGS. 3 and 4, according to an example of the present disclosure.

Turning now to FIG. 7, there is shown a schematic representation of a computing device 700 that may be used as a platform for implementing or executing at least one of the processes depicted in FIGS. 3 and 4, according an example. The device 700 includes a processor 702, such as a central processing unit; a display 704, such as a monitor; a network interface 708, such as a Local Area Network LAN, a wireless 802.11x LAN, a 3G mobile WAN or a WiMax WAN; and a computer-readable medium 710. Each of these components is operatively coupled to a bus 712. For example, the bus 712 may be an EISA, a PCI, a USB, a FireWire, a NuBus, or a PDS.

The computer readable medium 710 may be any suitable medium that participates in providing instructions to the processor 702 for execution. For example, the computer readable medium 710 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 710 may also store other machine-readable instructions, including word processors, browsers, email, Instant Messaging, media players, and telephony machine readable instructions.

The computer-readable medium 710 may also store an operating system 714, such as Mac OS, MS Windows, Unix, or Linux; network applications 716; and a document management application 718. The operating system 714 may be multi-user, multiprocessing, multitasking, multithreading, real-time and the like. The operating system 714 may also perform basic tasks, such as recognizing input from input devices, such as a keyboard or a keypad; sending output to the display 704; keeping track of files and directories on medium 710; controlling peripheral devices, such as disk drives, printers, image capture device; and managing traffic on the bus 712. The network applications 716 include various components for establishing and maintaining network connections, such as machine readable instructions for implementing communication protocols including TCP/IP, HTTP, Ethernet, USB, and FireWire.

The document management application 718 provides various machine readable instructions for managing sequential access to a digital document by a plurality of participants 110a-110n, as described above with respect to FIGS. 3 and 4. Thus, for instance, the document management application 718 may include machine-readable instructions for creating a key-map file for each of the workflow participants 110a-110n, sorting the key-map files in an order that is the reverse of a workflow order in which the workflow participants for which the key-map files were created are to access the secure content, creating an encrypted later wrap including a later key-map file for a later workflow participant along the workflow order, creating an encrypted first wrap including a prior key-map file for a prior workflow participant and the encrypted later wrap, wherein the prior workflow participant is to access the secure content prior to the later workflow participant, and incorporating the first wrap into a document serialization for the content. In certain examples, some or all of the processes performed by the application 718 may be integrated into the operating system 714. In certain examples, the processes may be at least partially implemented in digital electronic circuitry, or in computer hardware, machine-readable instructions (such as, firmware and/or software), or in any combination thereof.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, in which the present disclosure is intended to be defined by the following claims—and their equivalents—in which all terms are mean in their broadest reasonable sense unless otherwise indicated.

What is claimed is:

1. A method for managing sequential access to secure content by a plurality of workflow participants, said method comprising:
   creating, by a processor, a key-map file for each of the plurality of workflow participants, each of the key-map files containing a subset of encryption and signature keys for the content, wherein the subset of the encryption and signature keys contained in each of the key-map files corresponds to a level of access granted to each of the respective plurality of workflow participants;
   sorting the key-map files in an order that is the reverse of a workflow order in which the workflow participants for which the key-map files were created are to access the secure content;
   creating an encrypted later wrap containing a later key-map file for a later workflow participant along the workflow order;
   creating an encrypted first wrap containing a prior key-map file for a prior workflow participant, a second encryption key, and the encrypted later wrap, wherein the encrypted later wrap contained in the encrypted first wrap is able to be decrypted after the encrypted first wrap has been decrypted, wherein the prior workflow participant is to access the secure content prior to the later workflow participant, wherein the prior workflow participant is to re-encrypt a decrypted secure content using the second encryption key, and wherein creating the encrypted later wrap further comprises creating the encrypted later wrap to also contain a decryption key to decrypt the re-encrypted secure content; and
   incorporating the encrypted first wrap into a document serialization for the content.

2. The method according to claim 1, further comprising:
   creating the document serialization for the content.

3. The method according to claim 1, further comprising:
   generating the encryption and signature keys for the content;
   encrypting the content using the encryption key for the content;
   signing the content using the signature key for the content; and
   incorporating the encrypted and signed content into the document serialization.

4. The method according to claim 1, wherein creating the encrypted later wrap further comprises encrypting the later wrap using a public key of the later workflow participant to create the encrypted later wrap and wherein creating the encrypted prior wrap further comprises encrypting the prior wrap using a public key of the prior workflow participant to create the encrypted first wrap.

5. The method according to claim 1, wherein creating the encrypted later wrap further comprise signing the later wrap using a signature key for the later wrap and wherein creating the encrypted prior wrap further comprises signing the prior wrap using a signature key for the prior wrap.

6. The method according to claim 1, wherein signing the later wrap and signing the prior wrap further comprise signing the later wrap and the prior wrap using separate signature keys.

7. The method according to claim 1, wherein signing the later wrap and signing the prior wrap further comprise signing the later wrap and the prior wrap using a master signature key of a creator of the content.

8. The method according to claim 1, wherein creating the encrypted prior wrap further comprises creating the encrypted prior wrap to contain document level information that links the secure content to the prior workflow participant and contains information on the later workflow participant.

9. The method according to claim 1, wherein creating the encrypted later wrap and creating the encrypted prior wrap further comprise creating the encrypted later wrap and the encrypted prior wrap recursively using:

$$R_i = Enc_i\{map_i + docInf + R_{i+1}\},$$

wherein $map_i$ is the key-map file of the ith workflow participant, docInf is document level information, and $R_{i+1}$ is the wrap of the next workflow participant, and $Enc_i$ indicates that each of the wraps is encrypted using an encryption key, and wherein $R_{N+1} = 0$ for a workflow with N participants.

10. The method according to claim 1, further comprising: supplying the document serialization for the content to the prior workflow participant.

11. An apparatus for managing sequential access to content by a plurality of workflow participants, said apparatus comprising:
a processor; and
a memory on which is stored machine readable instructions that when executed by a processor cause the processor to create a document serialization for the content, to create a key-map file for each of the plurality of workflow participants, each of the key-map files containing a subset of encryption and signature keys for the content, wherein the subset of the encryption and signature keys contained in each of the key-map files corresponds to a level of access granted to each of the respective plurality of workflow participants, to sort the key-map files in an order that is the reverse of a workflow order in which the workflow participants for which the key-map files were created are to access the encrypted and signed content, to create an encrypted later wrap containing a later key-map file for a later workflow participant along the workflow order, to create an encrypted prior wrap containing a first key-map file for a prior workflow participant, a second encryption key, and the encrypted later wrap, wherein the encrypted later wrap contained in the encrypted first wrap is able to be decrypted after the encrypted first wrap has been decrypted, wherein the prior workflow participant is to access the secure content prior to the later workflow participant, wherein the prior workflow participant is to re-encrypt a decrypted secure content using the second encryption key, and wherein creating the encrypted later wrap further comprises creating the encrypted later wrap to also contain a decryption key to decrypt the re-encrypted secure content, and to incorporate the prior wrap into the document serialization for the content.

12. The apparatus according to claim 11, wherein the machine readable instructions are further to cause the processor to generate the encryption and signature keys for the content, to encrypt the content using the encryption key for the content, to sign the content using the signature key for the content, and to incorporate the encrypted and signed content into the document serialization.

13. The apparatus according to claim 11, wherein the machine readable instructions are further to cause the processor to create the encrypted later wrap through use of a public key of the later workflow participant, and to create the encrypted prior wrap through use of a public key of the prior workflow participant.

14. The apparatus according to claim 11, wherein the machine readable instructions are further to cause the processor to create the encrypted prior wrap to contain document level information that links the encrypted and signed content to the prior workflow participant and contains information on the later workflow participant.

15. The apparatus according to claim 11, wherein the machine readable instructions are further to cause the processor to create the encrypted later wrap and the encrypted prior wrap recursively using:

$$R_i = Enc_i\{map_i + docInf + R_{i+1}\},$$

wherein $map_i$ is the key-map file of the ith workflow participant, docInf is document level information, and $R_{i+1}$ is the wrap of the next workflow participant, and $Enc_i$ indicates that each of the wraps is encrypted using an encryption key, and wherein $R_{N+1} = 0$ for a workflow with N participants.

16. A non-transitory computer readable storage medium on which is embedded a computer program, said computer program implementing a method for managing sequential access to content by a plurality of workflow participants, said computer program comprising a set of instructions to:
create a document serialization for the content;
generate encryption and signature keys for the content;
encrypt the content using the encryption key for the content;
sign the content using the signature key for the content;
incorporate the encrypted and signed content into the document serialization;
create a key-map file for each of the plurality of workflow participants, each of the key-map files containing a subset of encryption and signature keys for the content, wherein the subset of the encryption and signature keys contained in each of the key-map files corresponds to a level of access granted to each of the respective plurality of workflow participants;
sort the key-map files in an order that is the reverse of a workflow order in which the workflow participants for which the key-map files were created are to access the encrypted and signed content;
create an encrypted later wrap containing a later key-map file for a later workflow participant along the workflow order;
create an encrypted prior wrap containing a prior key-map file for a prior workflow participant along the workflow order, a second encryption key, and the encrypted later wrap, wherein the encrypted later wrap contained in the encrypted first wrap is able to be decrypted after the encrypted first wrap has been decrypted, and wherein the prior workflow participant is to access the secure content prior to the later workflow participant, wherein the prior workflow participant is to re-encrypt a decrypted secure content using the second encryption key, and wherein creating the encrypted later wrap further comprises creating the encrypted later wrap to also contain a decryption key to decrypt the re-encrypted secure content; and
incorporate the prior wrap into a document serialization for the content.

17. The non-transitory computer readable storage medium according to claim 16, said computer program comprising a further set of instructions to:
encrypt the later wrap using a public key of the later workflow participant; and
encrypt the prior wrap using a public key of the prior workflow participant.

18. A method for accessing secure content by a particular workflow participant of a plurality of workflow participants that are to access the secure content in a predetermined order, wherein the secure content contains a document serialization that includes an encrypted first wrap and an encrypted later wrap, wherein the encrypted first wrap includes a key-map file for the particular workflow participant, a second encryption key, and an encrypted second wrap, said method comprising:

in a computing device of the particular workflow participant, receiving the secure content containing the document serialization;

verifying authenticity of the secure content;

decrypting the encrypted first wrap with a decryption key of the particular workflow participant, wherein decryption of the encrypted first wrap uncovers the key-map file for the particular workflow participant and the encrypted second wrap, wherein the encrypted second wrap is able to be decrypted after the encrypted first wrap has been decrypted, wherein the key-map file contains a subset of encryption and signature keys, and wherein the subset of the encryption and signature keys corresponds to a level of access granted to the particular workflow participant;

accessing the key-map file to obtain the subset of the encryption and signature keys;

implementing the subset of at least one of the encryption key and the signature key to gain the level of access to the secure content granted to the particular workflow participant;

encrypting the secure content using the second encryption key, wherein the encrypted later wrap contains a decryption key to decrypt the secure content encrypted using the second encryption key;

replacing the secure content in the document serialization with the encrypted secure content; and updating the document serialization by discarding the encrypted first wrap and key-map file.

19. The method according to claim 18, further comprising:

identifying a next workflow participant in the predetermined order; and sending the secure content with the updated document serialization to the next workflow participant.

20. The method according to claim 18, further comprising:

updating the secure content;

signing the updated secure content using a second signature key contained in the key-map file; and wherein replacing the secure content further comprises replacing the secure content in the document serialization with the encrypted, signed, and updated secure content.

* * * * *